Nov. 22, 1949  K. D. INGE  2,489,183
UNIVERSAL TOOL HEAD FOR LATHES
Filed Feb. 14, 1947  2 Sheets-Sheet 1
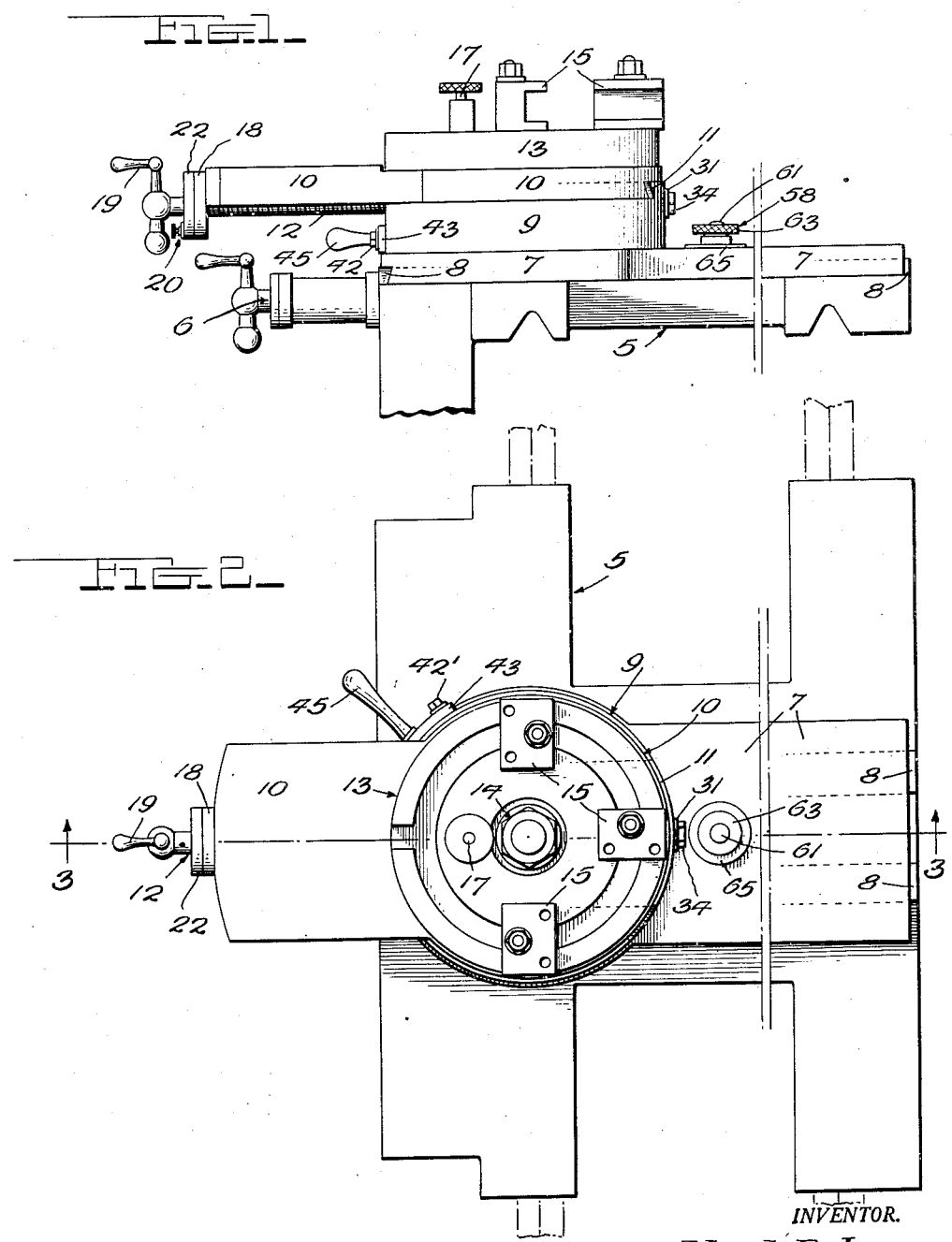
INVENTOR.
Karl D. Inge
BY
J. R. Prince
atty.

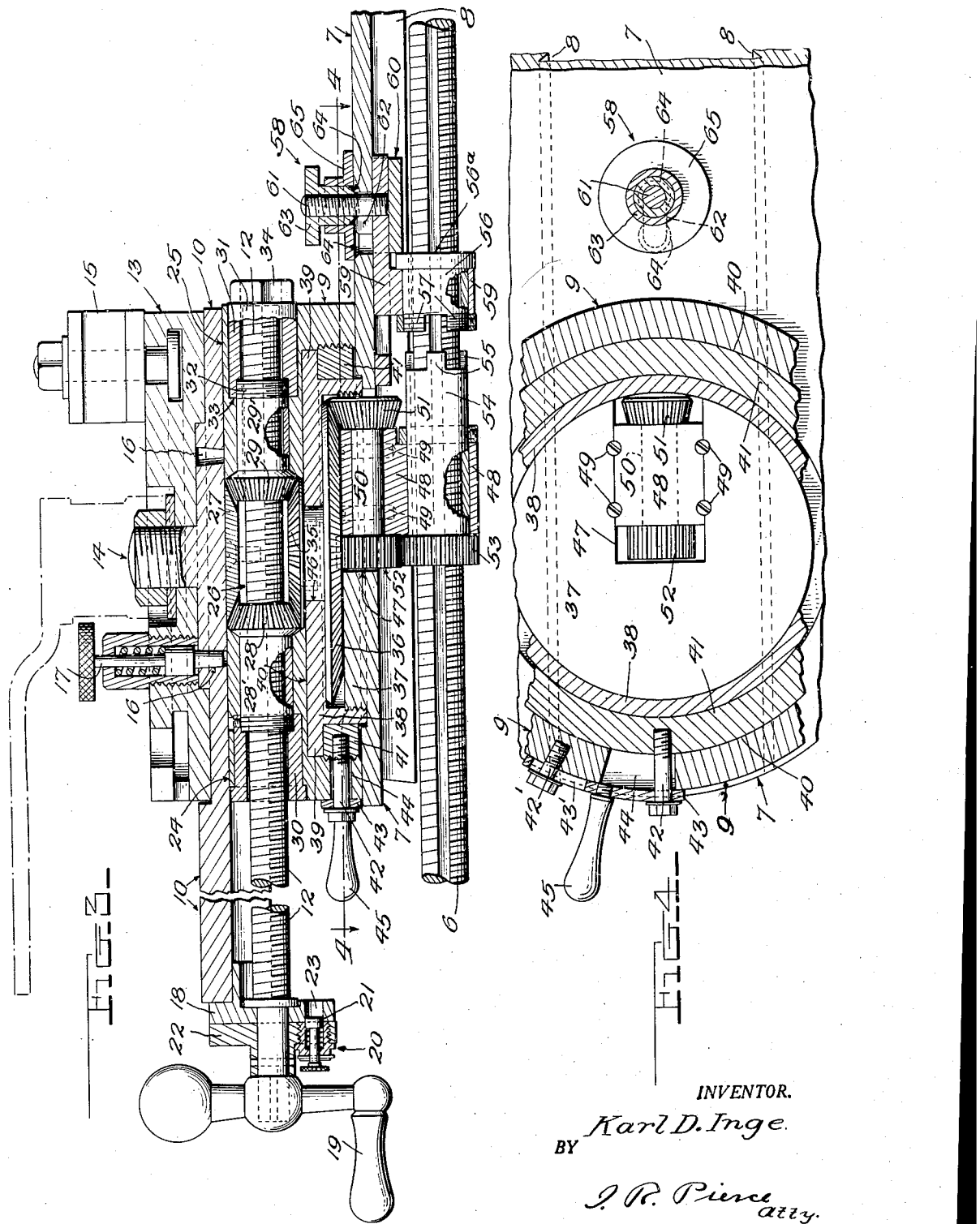

Patented Nov. 22, 1949

2,489,183

UNITED STATES PATENT OFFICE 2,489,183

UNIVERSAL TOOLHEAD FOR LATHES

Karl D. Inge, Roanoke, Va.

Application February 14, 1947, Serial No. 728,641

4 Claims. (Cl. 82—21)

The invention relates primarily to tool-mounting-and-feeding means for lathes, of the general type in which the cross-slide of a lathe carriage carries a head rotatable upon a vertical axis, and in which said rotatable head supports a tool-carrying slide, independent feed screws being provided for said cross-slide and tool-carrying slide. I provide gearing between the cross-slide feed screw and the upper feed screw for the tool-carrying slide, the initial gear of said gearing being connectable with said cross-slide feed screw by means of a clutch, and the principal object of the invention is to make novel provision whereby said feed screw may (1) act only as a feed screw for the cross-slide, (2) may drive said gearing to feed said tool-carrying slide, and (3) may drive said gearing to rotate the rotatable head. In such a tool-mounting-and-feeding means, an important requisite is that the tool-carrying slide be capable of being fed by either hand or power regardless of the angular position which it may occupy, and this requirement is fully answered by the present invention.

More broadly stated, the invention relates to tool-mounting-and-feeding means in which a tool-mounting-and-feeding structure includes a supporting base or head mounted on the cross-slide to rotate about a vertical axis. I provide gearing and driving means therefor, and another object is to make novel provision whereby said gearing may be driven to actuate the tool-feeding means of the aforesaid structure when said head is locked against rotation, and whereby part of said gearing may be driven to rotate said head of said structure, when said head is released for rotation.

Yet another object is to provide tool-mounting-and-feeding means, of the type set forth in the immediately preceding paragraph, in which the driving gear of said gearing is threaded upon a feed screw for the cross-slide and is connectable with said feed screw by means of a clutch, and in which said driving gear may be locked against rotation when desired; whereby said screw may act only as a feed scew for the cross-slide when said driving gear is locked against rotation and said clutch disengaged, and said feed screw may drive the gearing for either of the above stated purposes when said clutch is engaged.

A further object, in a tool-mounting-and-feeding mechanism, is to provide a novel assemblage comprising a tool-feeding screw connected with a slide and threaded through a gear, means for either locking said screw against rotation or for freeing it for hand rotation, means whereby said gear may be locked against rotation when desired, and means for driving said gear when desired; whereby freeing said screw and locking said gear will cause hand rotation of said screw to produce tool-feeding, and locking said screw and freeing and driving said gear will produce a power feed for the tool.

A still further object is to make novel and advantageous provision capable of performing all gear-locking functions required in the tool-mounting-and-feeding mechanism herein disclosed.

Yet another object is to provide novel means for either locking the rotatable supporting head of a tool-mounting mechanism against rotation or for permitting such rotation.

A still further object is to provide a construction which, regardless of the relatively movable elements which it embodies, will more rigidly support the tool than conventional compound tool rests.

By embodying the characteristics outlined above, the invention is of unusual merit for not only performing such functions as those usually performed by a compound tool rest, but for radius and ball-turning, and irregular form turning.

Figure 1 is an elevation showing the invention as viewed from one end of the lathe carriage.

Figure 2 is a top plan view.

Figure 3 is a vertical longitudinal section on line 3—3 of Fig. 2.

Figure 4 is a horizontal section on line 4—4 of Fig. 3.

A preferred construction has been shown in the drawings and will be rather specifically described, but numerous variations may be made within the scope of the invention as claimed.

A lathe carriage is rather diagrammatically indicated at 5, said carriage having a cross-slide feed screw 6 and being associated in the usual way with conventional carriage feeding means (not shown) and with driving means (not shown) for the screw 6.

Upon the carriage 5, a cross slide 7 is mounted by conventional means 8. Mounted on this cross-slide for rotation about a vertical axis, is a head 9 of preferably cylindrical form; mounted on this head 9 is a tool-carrying slide 10, the mounting means of which is indicated at 11 in Figs. 1 and 2; and at 12 a feed screw is shown for said slide 10. The slide 10 preferably carries a suitable turret 13 angularly adjustable around a clamping stud and nut 14 and provided with tool-holding and binding means 15 mounted for circumferential adjustment with respect to said turret. Station holes 16 are shown cooperable with a spring-pressed pin 17 for holding the turret in one position or another. However, the present invention is not concerned with any particular means for mounting a tool or tools upon the slide 10.

The screw 12 is rotatably mounted at one end in a bearing 18 secured to the tool-carrying slide 10, is held against axial shifting in said bearing and is provided with an operating handle 19. Locking means 20 is provided settable to either lock this screw 12 against rotation or to free it for hand operation, said locking means preferably comprising a spring-pressed pin 21 carried by a collar 22 on the screw 12 and engageable with an opening 23 in the bearing 18, suitable provision being made whereby turning of said pin a quarter revolution after withdrawing it from said opening, will hold said pin retracted. The screw 12 extends through diametrically alined bores 24 and 25 in the head 9, and said bores communicate with a central recess 26 in said head 9, said recess being closed at its top by a covered plate 27. Two bevel gears 28 and 29 surround the screw 12 in the recess 26 and are provided with hubs 28' and 29' rotatable in the inner end portions of the bores 24 and 25 respectively, said gears abutting the side wall of said recess 26 for end-thrust purposes. A thrust collar 30 secured to the hub 28' holds the gear 28 against inward axial shifting and the screw 12 is threaded through said gear 28 and hub 28'. The gear 29 and its hub 29' have no threaded engagement with screw 12. A sleeve 31 surrounds screw 12, is rotatable in the outer end of bore 25, and is threaded at 32 upon the outer end of the hub 29' of the gear 29. The inner end of this sleeve 31 is cooperable with a thrust-shoulder 33 of head 9, and the outer end of said sleeve is provided with a wrench-engaging head 34. By threading the sleeve 31 inwardly upon the hub 29', the gear 29 will be locked against rotation, and by threading said sleeve outwardly, said gear 29 will be released for rotation. Setting of the sleeve 31 in either effective position or released position will affect not only the gear 29 but other gears also, as hereinafter explained. It may be here stated, however, that gear 28 is one of the gears which is either permitted to rotate or is locked against rotation according to the setting of sleeve 31, and it may be further explained that when said gear 28 is locked and screw 12 is unlocked at 20, said screw may be hand-rotated to feed the slide 10 and the tool mounted thereon. It may also be relevantly stated here that when screw 12 is locked at 20, and gear 28 is driven, this gear longitudinally moves said screw 12 to feed slide 10 by power.

A vertical-axis bevel gear 35 occupies the lower portion of the recess 26 and meshes with both gears 28 and 29, and said gear 35 is hub-connected unitarily with a larger vertical-axis bevel gear 36, this double-gear 35, 36 being rotatably mounted on the cross-slide 7 in concentric relation with the axis of rotation of the head 9, in a manner which may be better defined after describing the manner of rotatably mounting said head 9 on said cross-slide 7.

The cross-slide 7 is provided with an integral upstanding boss 37 upon which a cap-like trunnion 38 is fixedly threaded, said trunnion 38 having a continuous peripheral flange 39 spaced upwardly from the top of the cross-slide 7. The lower side of the head 9 is provided with a cylindrical recess 40 receiving the trunnion 38 and its flange 39, the top of said recess 40 being in contact with the top of said trunnion and flange. A ring nut 41 is threaded into the recess 40 under the flange 39 and is cooperable with said flange 39 to either lock the head 9 against rotation or to free said head for rotation, according to the position to which said ring-nut is manually turned. When the ring-nut 41 is tightened, it not only clamps the flange 39 against the top of the recess 40, but draws the head 9 solidly down upon the cross-slide 7, solidly holding said head against rotation.

In the present disclosure, two cap screws 42 and 42' extend through an arcuate strap 43 which contacts with the periphery of the head 9. The screw 42 extends through an arcuate slot 44 in the head 9, and is threaded into the ring-nut 41 to connect the latter with said strap 43. This strap is provided with a handle 45 for turning it to turn the ring nut 41 to either set the latter in head-locking position or in head-freeing position. The screw 42' extends through slot 43' in the strap 43 and is threaded into head 9, said screw 42' being effective to lock strap 43 or to free said strap, thereby locking the ring-nut 41 after turning it, or freeing said ring-nut for rotation, as desired.

The joining hub of the double-gear 35—36 is rotatably mounted in an opening 46 in the cap-like trunnion 38 and the gear 36 is confined between the top plate of said trunnion and the boss 37.

An opening 47 is formed in the cross-slide 7 and its boss 37, and the upper end of a bearing block 48 is secured in said opening by screws 49. In the upper end of this bearing block 48, a horizontal shaft 50 is mounted, said shaft having a bevel gear 51 on one end and a spur gear 52 on its other end, said bevel gear 51 being in mesh with the large gear 36. Another spur gear 53 meshes with the gear 52 and is provided with an elongated hub 54 rotatably mounted in the lower end of the bearing block 48. The cross-slide feed screw 6 is threaded through this gear and hub 53, 54, and one end of said hub is provided with clutch teeth 55. A shiftable clutch 56 is splined at 56ª on the cross-slide feed screw 6 and is formed with teeth 57 for engagement with the teeth 55 when desired. Suitable means 58 is provided for setting the clutch 56 in either an effective or a freed position and for locking it in the selected setting.

The clutch shifting and locking means 58, in the present disclosure, comprises a bearing 59 slidably mounted at 60 under the cross-slide 7, a stud 61 rising from part of said bearing and extending through a slot 62 in said slide 7, and a nut 63 on said stud engageable with suitable recesses 64 at the ends of said slot. A suitable cover washer for the slot 62, is shown at 65, resting slidably on the cross-slide 7. Loosening of nut 63 permits it to act as a handle for shifting the clutch 56, and tightening of said nut 63 will then lock said clutch 56 in the position at which it has been set.

It will be observed that the gears 53, 52, 51, 36, 35 and 28 constitute a constantly meshed gear train from the cross-slide feed screw 6 to the upper feed screw 12, said cross-slide feed screw 6 being threaded through the initial gear 53 of said train, and said screw 12 being threaded through the final gear of said train. It will also be observed that the intermediate gear (36) of the train is concentric with the head 9 and that the adjacent intermediate gear 51 meshes with said gear 36. Thus, dependent upon the settings of the previously described locking means (the screw locking means 20, the gear locking means 31, and the head locking means 41), and the setting of the clutch element 56, the cross-slide feed screw 6 may act, whether driven by hand or power, (1) as a cross-slide feed screw only, (2) as a gear train driving shaft for causing longitudinal movement of the upper screw 12 to feed the tool-carrying slide 10, and (3) as a gear driving shaft for causing rotation of the head 9, all of which will now be more specifically explained, as follows, with numbers corresponding to those just used.

(1) It will be recalled that the sleeve 31 is operable to lock the associated gear 29. As this gear meshes with the gear 35, locking of 29 will also lock 35 and all other gears of the constantly meshed train against rotation about their axes if the head 9 be locked against rotation by means of the ring-nut 41. Then, the initial gear 53 acts only as a nut, and rotation of the cross-slide feed screw 6 by hand or power will consequently feed the cross-slide 7, and obviously all parts mounted on this slide move with it.

(2) With the gearing unlocked (by loosening sleeve 31), with screw 12 locked at 20, and with the clutch 56 engaged with the hub 54 of the initial gear 53, the cross-slide feed screw 6 will act not as a screw but as a drive shaft for the gear train, causing the final gear 28 (threaded upon screw 12) to longitudinally move the tool-carrying slide 10.

(3) When the gear 29 is locked and the head 9 freed for rotation (by loosening ring-nut 41), the gears 29, 28, 35 and 36 are held against rotation with respect to said head 9 but are unitarily connected with said head 9 to turn bodily therewith. Thus, with clutch 56 engaged, the cross-slide feed screw 6 will again act as a shaft instead of a screw, and will drive the gears 53, 52, 51, 36 and 35, thereby rotating the head 9.

At any time when the gear 28 is held against rotation, upon its axis, the screw 12, if unlocked at 20, may be hand-rotated to feed the tool-carrying slide 10.

It will be seen from the foregoing that novel and advantageous provision has been made for carrying out the objects of the invention, and while preferences have been disclosed, attention is again invited to the possibility of making variations within the scope of the invention as claimed.

I claim:

1. In a mechanism including a lathe carriage, a cross-slide mounted on said carriage, a head mounted on said cross-slide for rotation about a vertical axis, a tool-carrying slide mounted for horizontal sliding upon said head, a carriage-carried feed screw for said cross-slide, and an upper feed screw rotatably mounted on said tool-carrying slide and held against longitudinal shifting with respect thereto; means for locking said upper feed screw against rotation when desired, releasable means for locking said head against rotation when desired, a train of constantly meshed gears between said cross-slide feed screw and said upper feed screw, said gear train including an initial gear through which said cross-slide feed screw is threaded and a final gear through which said upper feed screw is threaded, said initial gear being rotatably mounted on said cross-slide, said final gear being rotatably mounted on said head, said gear train also including one intermediate gear in concentric relation with the axis of said head, and a second intermediate gear rotatably mounted on said cross-slide and meshing with said one intermediate gear, locking means whereby said one intermediate gear may be unitarily connected with said head to turn bodily therewith when desired, and clutch means for connecting said cross-slide feed screw with said initial gear, each of the aforesaid locking means and said clutch means being settable in either an effective setting or a released setting; whereby, dependent upon these settings, said cross-slide feed screw may act (1) as only a feed screw for said cross-slide, (2) as a gear-driving shaft to cause said final gear to longitudinally move said upper feed screw to thereby feed said tool-carrying slide, and (3) as a gear-driving shaft for causing rotation of said head about its axis, and said upper feed screw may be rotated within said final gear to feed said tool-carrying slide.

2. In a mechanism of the class described having a head and a tool-carrying slide mounted thereon; a feed screw for longitudinally feeding said slide, said screw being rotatably connected with said slide and being held against longitudinal movement with respect to said slide, a gear through which said screw is threaded, said gear being mounted on said head and held against axial shifting with respect thereto, means for driving said gear when desired, manually applied and released means for locking said gear against rotation when desired, and manually applied and released means for locking said screw against rotation when desired; whereby said screw may be rotated within said gear when the latter is locked and the screw released, and said gear may rotate upon said screw when the latter is locked and said gear driven.

3. In a mechanism of the class described having a head and a tool-carrying slide mounted thereon; a feed screw for longitudinally feeding said slide, said screw being rotatably connected with said slide and being held against longitudinal movement with respect to said slide, means for locking said screw when desired, one bevel gear through which said screw is threaded, said gear being rotatably mounted on said head and being held against axial shifting with respect to said head, means for driving said bevel gear when desired including a vertical-axis bevel gear rotatably mounted adjacent said head, a third bevel gear meshing with said vertical-axis gear, said third gear having a hub surrounding said screw and free of connection with the thread of the latter, and a manually rotatable sleeve having a threaded connection with said hub of said third gear, said head having oppositely facing thrust shoulders abutting said third gear and said sleeve respectively; whereby rotation of said sleeve with respect to said third gear will cause such relative endwise movement of said third gear and sleeve as to tightly clamp them against said thrust shoulders, thereby making it possible to lock the three gears against rotation when desired.

4. In a mechanism of the class described, a cross-slide having an upstanding trunnion, said trunnion having a continuous peripheral flange spaced above said cross-slide, a tool-carrying structure including a head resting upon said cross-slide and having a cylindrical recess in which said trunnion and its flange are received to rotatably mount said head, said head having a portion resting on said flange, a ring-nut surrounding said trunnion under its flange, said ring-nut being threaded into said recess for slight vertical movement, a strap contacting with the periphery of said head and having a handle and a slot, means connecting said strap with said ring-nut, said head having a slot through which said connecting means extends, both said slot of said strap and said slot of said head extending circumferentially of the latter, and a strap-clamping screw extending through said slot of said strap and threaded into said head.

KARL D. INGE.

REFERENCES CITED

The following references are of record in the file of this patent:

UNITED STATES PATENTS

| Number | Name | Date |
|---|---|---|
| 136,794 | Van Haagen | Mar. 11, 1873 |
| 1,095,278 | Hoepfner | May 5, 1914 |
| 1,314,744 | Groene | Sept. 2, 1919 |
| 2,423,941 | Laisne | July 15, 1947 |